United States Patent [19]

Reed et al.

[11] Patent Number: 5,714,072
[45] Date of Patent: Feb. 3, 1998

[54] METHOD FOR SOLVENT EXTRACTION USING A DUAL-SKINNED ASYMMETRIC MICROPOROUS MEMBRANE

[75] Inventors: Bradley W. Reed, Gastonia, N.C.; Kamalesh K. Sirkar, Berkeley Heights, N.J.

[73] Assignee: Hoechst Celanese Corporation, Somerville, N.J.

[21] Appl. No.: 552,528

[22] Filed: Nov. 6, 1995

[51] Int. Cl.⁶ .................... B01D 11/00; B01D 61/00; B01D 69/08
[52] U.S. Cl. .................... 210/644; 210/500.23; 210/649
[58] Field of Search .................... 210/645, 644, 210/500.23, 634, 321.87–321.9, 649, 650

[56] References Cited

U.S. PATENT DOCUMENTS

| Re. 34,828 | 1/1995 | Sirkar | 210/137 |
|---|---|---|---|
| 3,871,950 | 3/1975 | Hashino et al. | 161/178 |
| 3,951,789 | 4/1976 | Lee et al. | |
| 3,956,112 | 5/1976 | Lee et al. | |
| 4,181,694 | 1/1980 | Hashino et al. | 264/41 |
| 4,351,860 | 9/1982 | Yoshida et al. | 427/246 |
| 4,399,035 | 8/1983 | Nohmi et al. | 210/500.2 |
| 4,921,612 | 5/1990 | Sirkar | 210/644 |
| 4,966,707 | 10/1990 | Cussier et al. | 210/632 |
| 5,053,132 | 10/1991 | Sirkar | 210/500.23 |
| 5,264,171 | 11/1993 | Prassad et al. | 264/103 |
| 5,480,552 | 1/1996 | Soltys et al. | 210/645 |
| 5,637,224 | 6/1997 | Sirkar et al. | 210/500.23 |

OTHER PUBLICATIONS

"Novel Liquid–in–Pore Configurations in Membrane Solvent Extraction", *AIChE Journal*, vol. 36, No. 10, Oct. 1990 pp. 1592–1596.

"Aqueous–organic Membrane Bioreactors. Part I. A guide to membrane selection", *J. Membrane Sci*, vol. 71 (1992) pp. 139–149.

"MICROZA®" hollow fiber membrane marketed by Pall Corporation of East Hills, New York.

Ho et al. Ed., *Membrane Handbook*, Van Nostrand Rienhold, NYC, NY (1992) pp. 727–763. (Chapter 41 "Membrane–Based Solvent Extraction").

Noble, R.D. et al. Editors, *Membrane Separations Technology Principles and Applications*, Elsevier Science B.V., Amsterdam Netherlands, (1995), pp. 468–498.

*Primary Examiner*—Joseph W. Drodge
*Attorney, Agent, or Firm*—Robert H. Hammer, III

[57] ABSTRACT

The instant invention is directed to a method of solvent extraction. The steps of the method include: providing a dual-skinned asymmetric membrane; providing a feed containing a solute; and providing a solvent. The feed and the solvent are contacted across the membrane. The solute of the feed is extracted, and forming thereby a raffinate and an extract.

2 Claims, 1 Drawing Sheet

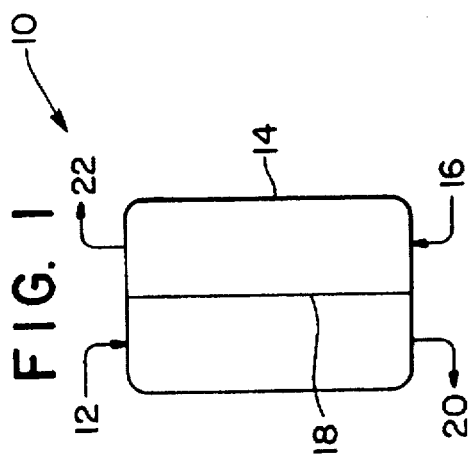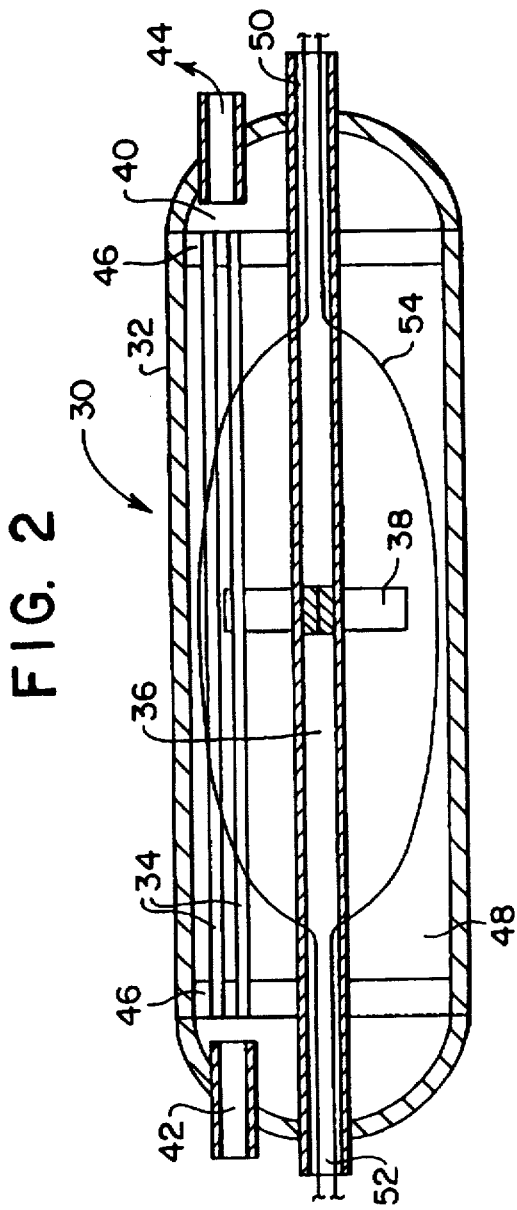

METHOD FOR SOLVENT EXTRACTION USING A DUAL-SKINNED ASYMMETRIC MICROPOROUS MEMBRANE

FIELD OF THE INVENTION

This invention is directed to a method for solvent extraction using a dual-skinned asymmetric microporous membrane.

BACKGROUND OF THE INVENTION

Membrane solvent extraction is known. See, for example: U.S. Pat. Nos. 3,951,789 and 4,997,569. Membrane solvent extraction differs from solvent extraction by the inclusion of a porous membrane. Membrane solvent extraction offers the ability to conduct solvent extraction without phase dispersion using contactors many times smaller than conventional (i.e. non-membrane) extraction equipment.

Single-skinned asymmetric microporous membranes have been used in membrane solvent extraction. See, for example: Prasad, R. et al., "Novel Liquid-in-Pore Configurations in Membrane Solvent Extraction", *AIChE Journal*, Vol. 36, No. 10, October 1990 pp. 1592–1596; and Vaidya, A. M. et al., "Aqueous-organic Membrane Bioreactors. Part I. A guide to membrane selection", *J. Membrane Sci*, Vol. 71 (1992) pages 139–149. Asymmetry, as used herein, refers to the changing diameter of the pores extending through the membrane or any non-uniform pore diameter. For example, the pore diameter at one membrane surface may be greater than the same pore's diameter at the opposite surface of the membrane. Skin refers to a single dense layer having a plurality of micropores there—through on one surface of the membrane. The skin side, where the smaller diameter pores are usually located, is typically used to immobilize the interface between the feed and solvent. The "openness" or high void volume of the membrane's interior and alternate side from the skin decreases the resistance of the membrane to mass transfer.

The ideal microporous membrane to facilitate solvent extraction has the following characteristics:

1. Small diameter pores to provide a stable interface at high differential pressures even with relatively low interfacial tension systems as governed by Young-LaPlace equation;
2. The ability to impregnate ("wet") pores with fluid offering the higher level of solute solubility, see, for example U.S. Pat. No. 4,966,707;
3. Pore characteristics that minimize mass transfer resistance, (e.g. high porosity, large diameter pores);
4. As thin a membrane (i.e., thickness) as possible, while maintaining sufficient physical strength.

Characteristics 1 and 3 are in conflict as related to pore size considerations. This conflict typically results in establishing a compromise pore size and porosity when using symmetric membranes, i.e., pores small enough to stabilize the interface, yet not too small to make membrane mass transfer resistance significant. Single-skinned asymmetric membranes have been used in the past, utilizing small pores on the skinned side of the membrane to immobilize the interface. The more open the interior and alternate side of the membrane, then the lessor is the membrane's resistance to mass transfer. The skinned surface can be placed next to either the feed or the solvent (e.g. the interior or exterior surface of the hollow fiber). The surface which is skinned determines where the fluid interface is established and which fluid must be placed within the pore in order to optimize the wetting fluid per characteristic 2. This is not, however, necessarily the optimum side for establishing the fluid interface to minimize mass transfer resistance for the limiting phase, since boundary layer resistances can vary substantially from side to side. To overcome this problem, customized contactors for each application have to be designed, e.g. skin placement and fluid placement must be tailored for each specific application.

Accordingly, there is a need for a membrane solvent extraction which allows independent choice of both the fluid interface location and, as a result, the side on which a given fluid may flow.

Dual-skinned asymmetric microporous membranes are known. See for example, the "MICROZA®" hollow fiber membrane marketed by Pall Corporation of East Hills, N.Y. and U.S. Pat. Nos. 3,871,950; 4,181,694; and 4,351,860 to Asahi Chemical Industries, LTD of Japan. The Microza membrane is used in ultrafiltration applications. Ultrafiltration is dependent upon a pressure driving force, a membrane that is permeable to some components of the solution or mixture and impermeable to others, and has bulk flow of the solvent through the membrane.

SUMMARY OF THE INVENTION

The instant invention is directed to a method of solvent extraction. The steps of the method include: providing a dual-skinned asymmetric membrane; providing a feed containing a solute; and providing a solvent. The feed and the solvent are contacted across the membrane. The solute of the feed is extracted, and forming thereby a raffinate and an extract.

DESCRIPTION OF THE DRAWINGS

For the purpose of illustrating the invention, there is shown in the drawings a form which is presently preferred; it being understood, however, that this invention is not limited to the precise arrangements and instrumentality shown.

FIG. 1 is a schematic illustration of a solvent extraction system according to the instant invention.

FIG. 2 is an illustration of a hollow fiber microporous membrane contactor.

DETAILED DESCRIPTION OF THE INVENTION

Solvent extraction refers to processes for the separation of components of a solution which depend upon the unequal distribution of the components between two immiscible liquids (i.e. a concentration driving force). Solvent extraction is also known as liquid extraction or liquid—liquid extraction.

Feed or feed solution refers to the solution whose components are to be separated. Feed, which is a solution, contains, at least, one solute and one fluid in which the solute is miscible. The solute is the component that is to be removed from the feed.

Solvent refers to the material (typically a liquid) used to remove the solute from the feed. Solvents may consist of: single component systems (i.e. primarily one substance) which may be recycled; or mixed components systems which may consist of a solution of one or more substances chosen to provide special properties. Solvents are also known as extractants.

Raffinate refers to the solute-lean, residual feed solution, with one or more solutes removed by extraction.

Extract refers to the solute-rich solvent.

Extraction refers to the mass transfer operation whereby solute from the feed moves to the solvent. Further information about extraction may be obtained with reference to the following, each of which is incorporated herein by reference: Perry, R. H. et al. Editors, *Chemical Engineer's Handbook 5th Ed.*, McGraw-Hill, Inc., NYC, N.Y. (1973), pp. 15-1–15-24; Noble, R. D. et al. Editors, *Membrane Separations Technology Principles and Applications*, Elsevier Science B.V., Amsterdam Netherlands, (1995), pp. 468–498; and Ho et al. Ed., *Membrane Handbook*, Van Nostrand Rienhold, NYC, N.Y. (1992) pp. 727–763. (Chapter 41 "Membrane-Based Solvent Extraction").

Contacting refers to how the feed or solvent wets or fills the pores of the membrane (e.g. is the membrane hydrophobic or hydrophilic) and develops an interface with the other immiscible fluid. Either the feed or the solvent may wet or fill the pores depending upon the separation. The interface between the feed and the solvent may be controlled to either surface or the interior of the membrane by differential pressure. For example, see: Prasad, R. et al., "Novel Liquid-in-Pore Configurations in Membrane Solvent Extraction", *AIChE Journal*, Vol. 36, No. 10, October 1990, pp. 1592–1596; U.S. Pat. Nos. 4,966,707; Re. 34,828; 5,053,132, each of which is incorporated herein by reference.

Dual-skinned asymmetric microporous membrane refers to an asymmetric microporous membrane having a skin formed upon each of its surfaces. For example, Pall Corporation of East Hills, N.Y. markets a dual-skinned asymmetric microporous membrane under the trademark MICROZA® hollow fiber membrane. Dual skinned asymmetric membranes are also disclosed in U.S. Pat. Nos. 3,871,950; 4,181,694, and 4,351,860, each is incorporated herein by reference.

A membrane contactor or extractor refers to the mechanical device that holds the membrane. The membrane may be in the form of a flat sheet, hollow fibers, or tubes. The contactor may be of any design suitable for the extraction. See: Noble et al. Ibid. The preferred contactor is disclosed in U.S. Pat. No. 5,264,171, which is incorporated herein by reference.

Referring to the drawings wherein like numerals indicate like elements there is shown in FIG. 1, a solvent extraction system 10. A feed solution 12 is fed into a contactor 14. Solvent 16 is also fed into contactor 14. A dual-skinned asymmetric membrane 18 is contained within that contactor 14. Solution 12 comes in contact with solvent 16 via membrane 18. Solute is extracted from the feed 12 across the membrane 18 and into the solvent 16 to form extract 22. The remaining feed less the solute forms raffinate 20.

Referring to FIG. 2, there is shown a preferred hollow fiber microporous membrane contactor 30 which is made according to U.S. Pat. No. 5,264,171. Contactor 30 generally comprises a shell 32 and a plurality of tubes 34. Tubes 34 are microporous hollow fibers. A center tube 36 is located along the longitudinal axis of shell 32. Center tube 36 is a perforated tube, so that fluid may ingress and egress. A baffle 38 may be affixed to center tube 36 intermediate the ends thereof. Shell 32, tube sheets 46, and the exterior surfaces of tubes 34 define shell side 48. Shell side 48 is provided with an inlet 50 and an outlet 52. The flow of material through the shell side 48 is indicated by 54. The interiors or lumenae of tubes 34 define, in part, tube side 40. Tube side 40 is provided with an inlet 42 and an outlet 44. The contactor 30 is not limited to the foregoing configuration. Prior to potting of the MICROZA® hollow fibers into the contactor, the fibers are soaked in pure water for one day, then treated with isopropyl alcohol for one hour, and then treated with n-hexane for one hour. The fiber are then air dried for thirty minutes.

The present invention may be embodied in other specific forms without departing from the spirit or essential attributes thereof and, accordingly, reference should be made to the appended claims rather than to the foregoing specification, as indicating the scope of the invention.

We claim:

1. A method for solvent extraction comprising the steps of:

providing a dual-skinned asymmetric membrane;

providing a feed containing a solute;

providing a solvent;

contacting the feed with the solvent across the membrane;

extracting the solute from the feed; and forming thereby a raffinate and an extract.

2. The method according to claim 1 wherein the membrane is provided as a hollow fiber membrane.

\* \* \* \* \*